No. 705,592. Patented July 29, 1902.
W. G. MacLAUGHLIN.
AIR BRAKE SYSTEM.
(Application filed May 11, 1901.)
(No Model.) 2 Sheets—Sheet 1.
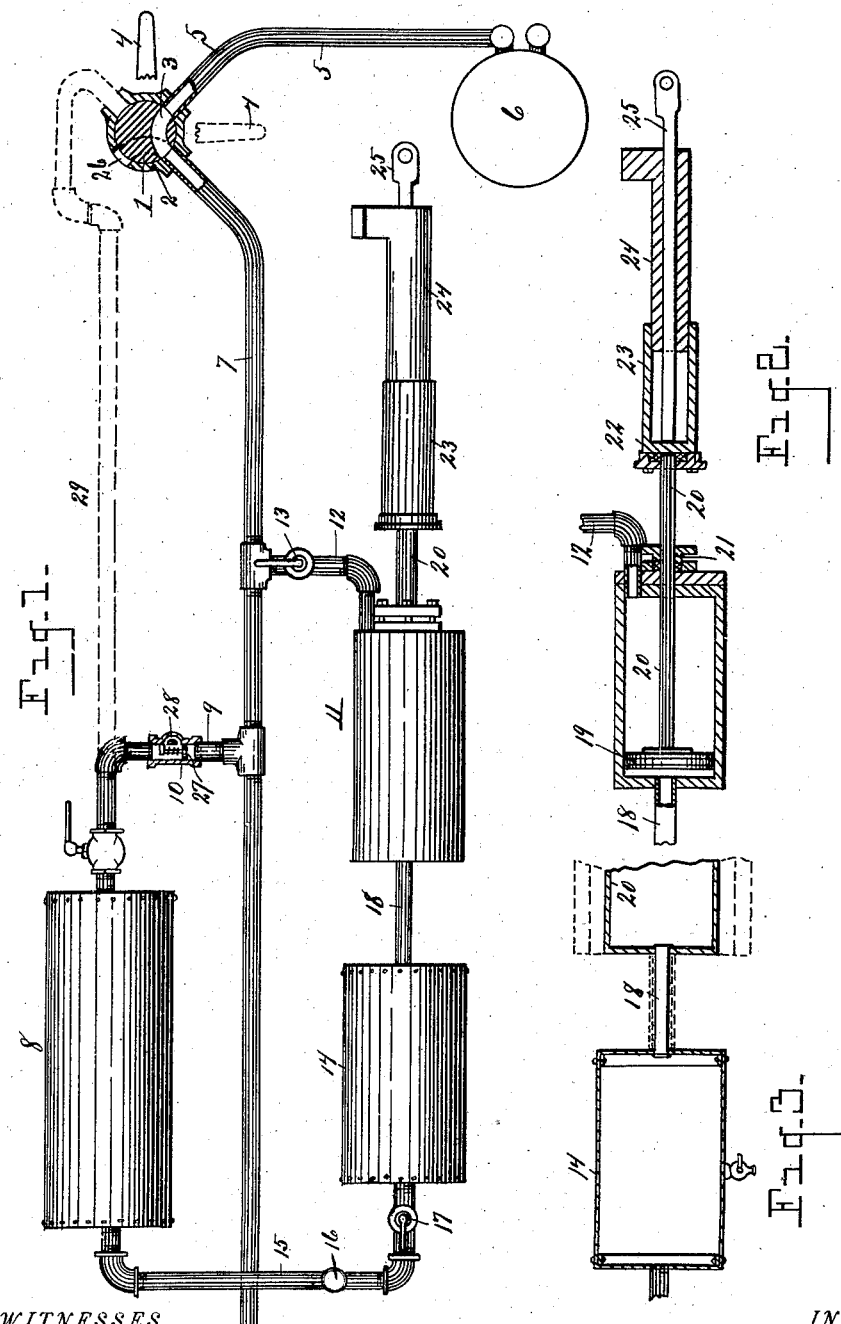
WITNESSES. INVENTOR.

No. 705,592. Patented July 29, 1902.
W. G. MacLAUGHLIN.
AIR BRAKE SYSTEM.
(Application filed May 11, 1901.)
(No Model.) 2 Sheets—Sheet 2.
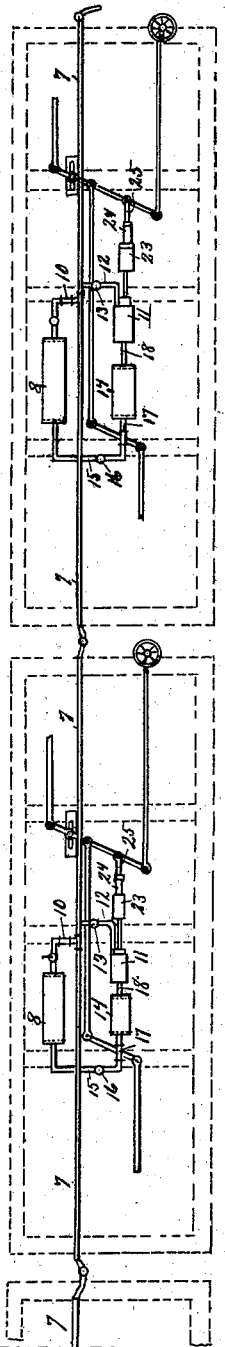
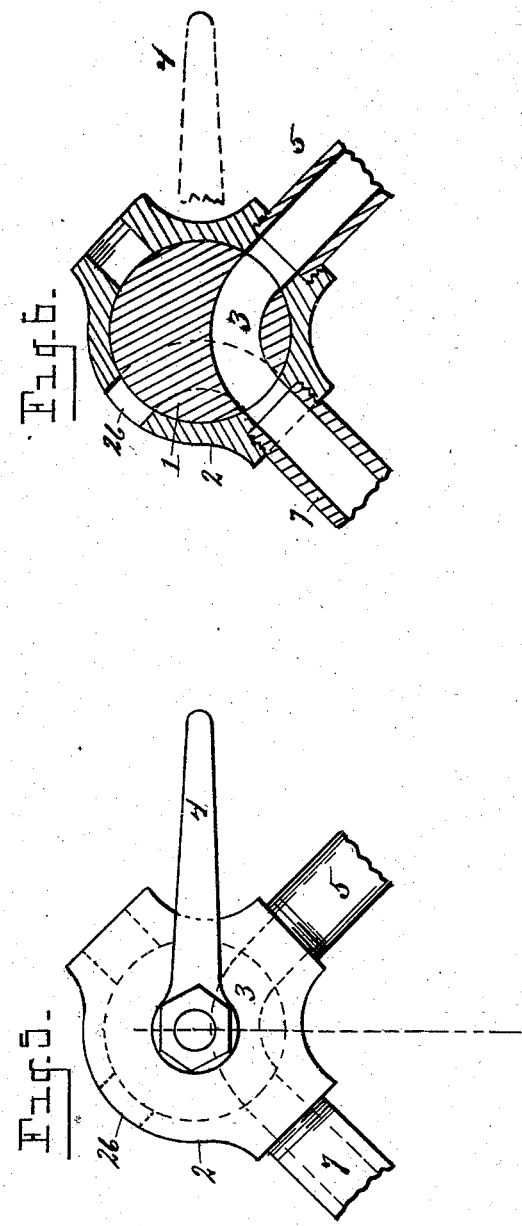
WITNESSES.
INVENTOR.
William G. MacLaughlin
By
Attorneys.

UNITED STATES PATENT OFFICE.

WILLIAM G. MacLAUGHLIN, OF WINDSOR, CANADA, ASSIGNOR TO THE MacLAUGHLIN RAILWAY BRAKE COMPANY, OF DETROIT, MICHIGAN, A CORPORATION OF MICHIGAN.

AIR-BRAKE SYSTEM.

SPECIFICATION forming part of Letters Patent No. 705,592, dated July 29, 1902.

Application filed May 11, 1901. Serial No. 59,741. (No model.)

*To all whom it may concern:*

Be it known that I, WILLIAM G. MACLAUGHLIN, a citizen of the United States, residing at Windsor, in the county of Essex, Province of Ontario, Canada, have invented certain new and useful Improvements in Air-Brake Systems; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to an air-brake system; and it consists in the construction and arrangement of parts hereinafter fully set forth, and pointed out particularly in the claims.

The object of the invention is to provide simple and efficient means for readily applying the brakes through the medium of air or other fluid pressure in which the arrangement is such as to render the system adaptable to a single car or to a series of cars, as desired. A further arrangement provides for an immediate application or release of the brakes, the holding of the brakes in release by an excess of air-pressure upon one side of the piston of the brake-cylinder, and the admittance of air to the brake-cylinder in such volume and under such control as to prevent so sudden an application of the brake as is calculated to slide the wheels and flatten the face thereof.

The above object is attained by the mechanism illustrated in the accompanying drawings, in which—

Figure 1 is a plan view of the brake system as applied to a single car, showing the train-pipe by which additional cars may be connected, if desired. Fig. 2 is a longitudinal section through the brake-cylinder and the sliding sleeve or guide connected with the piston-rod to guide it in its movement. Fig. 3 is a sectional view showing the connection between the auxiliary reservoir and the brake-cylinder. Fig. 4 is a diagrammatical view showing the system as employed on a number of cars, as in a train. Fig. 5 is a plan view of the engineer's brake-valve, through the medium of which the brakes are operated. Fig. 6 is a sectional view through said valve.

Referring to the characters of reference, 1 designates the engineer's brake-valve, mounted within a suitable valve-case 2 and located in the cab or motorman's vestibule, where it may be conveniently operated. Said valve is provided with a curved way 3 therethrough, whereby the passage of air to the various parts of the system may be controlled by the operation of said valve through the medium of the handle 4.

Communicating with the valve-case 2 is an air-pipe 5, connected with the air-pump 6, which may be driven from any suitable source of power. Also communicating with the valve-case 2 is the train-pipe 7, whereby air from the pump may be forced into said train-pipe and into the main reservoir 8, which is connected with the train-pipe through the pipe-section 9, having therein a byway-valve 10, which allows the air to flow into said reservoir from the train-pipe, but automatically prevents the return of the air to the train-pipe from said reservoir.

The brake-cylinder 11 is connected at one end to the train-pipe by means of the pipe-section 12, whereby the pressure of the train-pipe is present in the forward end of the brake-cylinder. In the pipe 12 is a cut-off valve 13, which allows the pressure to be cut off from the brake-cylinder, if desired. The auxiliary reservoir 14 is connected to the main reservoir 8 through the pipe 15, having a reducing-valve 16 therein of any suitable construction, which allows of the passage of air from the main reservoir to the auxiliary reservoir until the pressure within the auxiliary reservoir reaches a point within five pounds, more or less, of that of the main reservoir, when said reducing-valve will cut off any further flow of air to the auxiliary reservoir and maintain a pressure therein below the point of said main reservoir. A valve 17 in the pipe 15 allows the air to be cut off to prevent its escape from the auxiliary reservoir when it is desired to retain the air-pressure therein for some considerable time when the system is not in operation. Leading from the end of the auxiliary reservoir opposite to that with which the pipe 15 communicates is a pipe 18 of reduced diameter or area, which connects said auxiliary reservoir with the rear end of the brake-cylinder.

Located within the brake-cylinder is a piston-head 19, to which is attached the piston-rod 20, which passes through the forward end of the brake-cylinder and the stuffing-box 21 thereon and impinges against the end 22 of a sleeve 23, adapted to slide horizontally upon a cylindrical support 24. Said support 24 is made fast in any suitable manner and is provided with a longitudinal bore adapted to receive the brake-rod 25, which slides therein and the inner end of which passes into terminal contact with the end 22 of the sleeve 23. By this arrangement it will be seen that as the piston-head 19 moves forward in the brake-cylinder the piston-rod 20 will engage and slide the sleeve 23 upon its guiding-support 24, thereby moving the brake-rod 25 longitudinally and actuating the brake mechanism. It will also be seen that the brake-rod may have movement independently of the sleeve 23, whereby provision is made for the application of brakes by hand when required, as said brake-rod may be retracted longitudinally in the support 24 without affecting the position of the piston within the brake-cylinder.

It will now be understood that the pressure within the main reservoir, the train-pipe, and the forward end of the brake-cylinder is normally the same and that said pressure is in excess of that carried in the auxiliary reservoir connected with the rear end of the brake-cylinder, so that the pressure in the auxiliary reservoir is overcome by that within the forward end of the brake-cylinder, whereby the piston 19 thereof is maintained in the position shown in Fig. 2, and the brakes are held released. When it is desired to apply the brakes, the brake-valve is moved so as to connect the train-pipe 7 by way of the passage 3 in said valve with the port 26 in the valve-case, which opens to atmosphere, whereby the air may be permitted to exhaust the train-pipe until the pressure therein is reduced below that of the auxiliary reservoir 14, when the pressure from said reservoir will overcome that in the forward end of the brake-cylinder and allow the air in said auxiliary to expand into the rear of said cylinder through the pipe 18, thereby forcing the piston 19 to the forward end of the brake-cylinder and actuating the brake mechanism to apply the brakes. The force with which the brakes may be set is determined by the degree to which the pressure in the train-pipe is diminished by the operation of the brake-valve, which is under control of the engineer or operator and may be regulated according to the requirements. In making an emergency application of the brakes the brake-valve may be operated to open the train-pipe to atmosphere through the full area of the discharge-port 26, whereby the pressure therein may be reduced to atmosphere, allowing the brakes to be applied with all of the pressure contained in the auxiliary reservoir. After an application of the brakes they are released by turning the brake-valve so as to connect the train-pipe 7 with the air-pipe 5, leading from the pump, when the pressure in the train-pipe may be restored to the normal, thereby creating an excess of pressure in the forward end of the brake-cylinder and forcing the piston back to the position shown in Fig. 2, thereby releasing the brakes. The air which expanded into the rear of the brake-cylinder from the auxiliary in the act of applying the brakes is by the return of the piston forced back into the auxiliary, whereby the pressure in the auxiliary becomes restored to the normal and a waste of air from the auxiliary in the operation of braking is obviated. Should there have been an escape of air in the operation of applying the brakes, so as to reduce the pressure in the auxiliary below the normal, said pressure will be automatically raised or restored through the operation of the reducing-valve 16. The pressure in the auxiliary is supplied from the main reservoir 8, in which the pressure is maintained at the required degree through the medium of the pump when connected with the train-pipe, whereby the air may be forced into the main reservoir through the pipe 9.

The byway 10 in the pipe 9 comprises a spring-actuated plunger carrying a piston 27, which closes the pipe 9 and which is caused to recede by the pressure from the train-pipe, so as to expose the channel 28, through which the air may pass into the reservoir 8, until the pressure therein equals that of the train-pipe, when said piston will seat and prevent any outward flow of air through the pipe 9 from said reservoir 8. By this arrangement the air is prevented from escaping from the main reservoirs should the train-pipe break, thereby insuring the efficiency of the brake in such an emergency.

The pipe 18, connecting the auxiliary reservoir with the rear of the brake-cylinder, is comparatively small, the purpose of which is to prevent a sudden expansion of the air in the rear of the brake-cylinder at the full pressure of the auxiliary when the pressure in the forward end of the cylinder has been reduced through the opening of the train-pipe to atmosphere, as a sudden occupation of the rear of the brake-cylinder by the air at the full pressure of the auxiliary would move the piston therein so rapidly and forcibly as to jam the brake-shoes against the wheels and set or lock them from turning, thereby causing the wheels to slide and wear flat surfaces on their treads. By reducing the pipe through which the air expands into the brake-cylinder from the auxiliary the volume and pressure of air in the brake-cylinder is not so quickly increased, allowing the brake-beam after the first impulse to settle back and permit the shoes to gradually set themselves to the wheels, the piston-head in the brake-cylinder being allowed to vibrate or pulsate until the brake-shoes are finally forced against and held in contact with the wheels, a matter of great importance, as the sliding of the wheels by this means is almost entirely obviated.

Where the air-brake system herein explained is employed on a train, the air-pipe 7 is used to supply air to all the main reservoirs, and the main reservoir for each car is connected, as shown, with an auxiliary reservoir, so that by exhausting the air from the train-pipe to cause a diminution of pressure therein all of the brakes of the train will be simultaneously applied, and the restoration of pressure in the train-pipe will in like manner release all of the brakes. When the system is used on a single car, the train-pipe will be dispensed with beyond the connection with the brake-cylinder, and a pipe 29 (shown by dotted lines in Fig. 1) will connect the main reservoir directly with the brake-valve, so that by the operation of said valve the pump may be connected with the main reservoir to restore the pressure therein.

The dotted lines shown in Fig. 3, and which parallel the pipe 18 and the cylinder 20, are drawn to indicate the relative size of said pipe compared with the diameter of the cylinder. The solid lines indicate the normal size of said parts, while the dotted lines show a comparative increase in the size of the pipe and cylinder. The purpose of this arrangement is to maintain the same relative area between the cylinder and the pipe 18, so that the volume of air admitted to the cylinder through said pipe will at all times be such as to insure a perfect operation of the brake and obviate an excessive pressure in the brake-cylinder calculated to supply the brakes with such force as to slide the wheels.

Having thus fully set forth my invention, what I claim as new, and desire to secure by Letters Patent, is—

1. In a brake mechanism, the combination of a brake-cylinder having a piston therein connected with a brake mechanism, a train-pipe connected with the forward end of the brake-cylinder upon one side of the piston therein, an auxiliary reservoir connected with the rear of the brake-cylinder upon the opposite side of the piston, a main reservoir connected with the train-pipe and adapted to carry pressure equal to the train-pipe pressure, means connecting the auxiliary reservoir with the main reservoir to reduce the pressure in said auxiliary and maintain it normally below that of the train-pipe, means for reducing the train-pipe pressure below that of the auxiliary reservoir and means for restoring the train-pipe pressure to a point in excess of the pressure of said auxiliary.

2. In an air-brake system the combination of a main reservoir, a brake-cylinder, a piston in said cylinder connected with a brake mechanism, an air-pipe adapted to contain a relatively high pressure connected with the forward end of the brake-cylinder, an auxiliary reservoir adapted to normally contain a relatively low pressure connected to the opposite ends of the brake-cylinder by a pipe of comparatively small area, said auxiliary reservoir being also connected with the high-pressure pipe by way of the main reservoir, means for reducing the pressure in said air-pipe below that of the auxiliary reservoir and restore said pressure to the normal above that of the auxiliary.

3. In an air-brake system, the combination of the brake-cylinder having a piston therein connected with a brake mechanism, a train-pipe connected with the brake-cylinder on one side of said piston, a main reservoir connected with the train-pipe by a pipe containing a valve which allows the air to flow from the train-pipe into said main reservoir, but prevents the flow of air from the main reservoir to the train-pipe, an auxiliary reservoir connected to the brake-cylinder on the side of the piston opposite to that of the train-pipe connection, means for connecting the main reservoir with the auxiliary reservoir adapted to allow of the passage of air into said auxiliary reservoir at a pressure below that of the main reservoir and the train-pipe, and means for alternately reducing the train-pipe pressure below that of the auxiliary and increasing it to a point above the auxiliary pressure.

4. In an air-brake system, the combination of a main reservoir, a brake-cylinder, a piston therein connected by a piston-rod with a brake mechanism, a train-pipe containing air-pressure connected with the brake-cylinder on one side of said piston and an auxiliary reservoir, normally containing a pressure below that of the train-pipe, means for reducing and restoring the pressure of the train-pipe, a pipe connecting the auxiliary reservoir to the train-pipe through the main reservoir and a pipe connecting the auxiliary reservoir to the brake-cylinder of a relatively small diameter to prevent a sudden expansion of the air in the rear of the brake-cylinder when the pressure in the forward end thereof is reduced.

5. In an air-brake the combination of a brake-cylinder having a piston therein, a main reservoir, a primary air system containing a relatively high pressure connected with the main reservoir, a closed secondary air system containing a relatively low pressure indirectly connected to the primary system through said main reservoir, means directly connecting said systems with the cylinder, the piston in the cylinder being interposed between said air systems, and means for varying the pressure in the primary air system without affecting the pressure in the secondary system.

In testimony whereof I sign this specification in the presence of two witnesses.

WILLIAM G. MacLAUGHLIN.

Witnesses:
 E. S. WHEELER,
 C. E. JOSLIN.